R. W. HURD.
COOKING UTENSIL.
APPLICATION FILED JAN. 13, 1912.
1,051,233.
Patented Jan. 21, 1913.
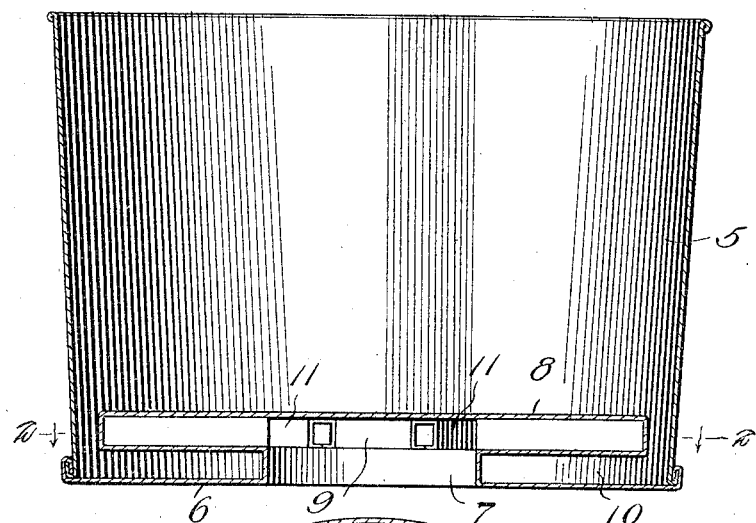
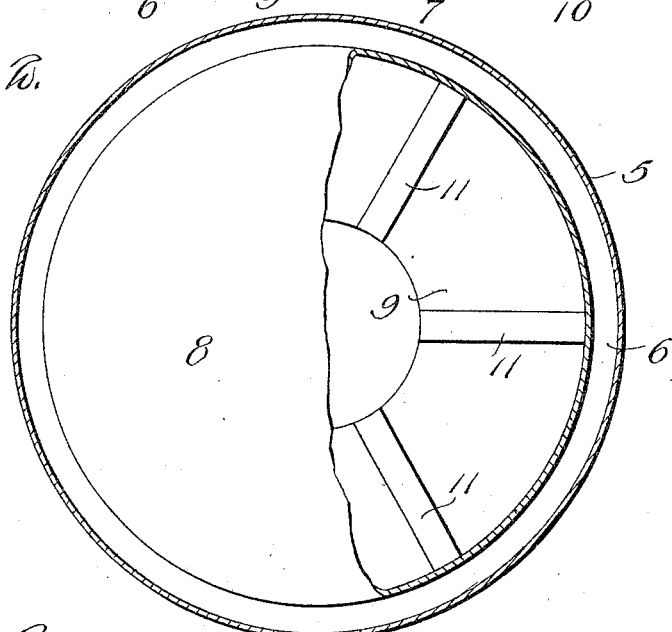
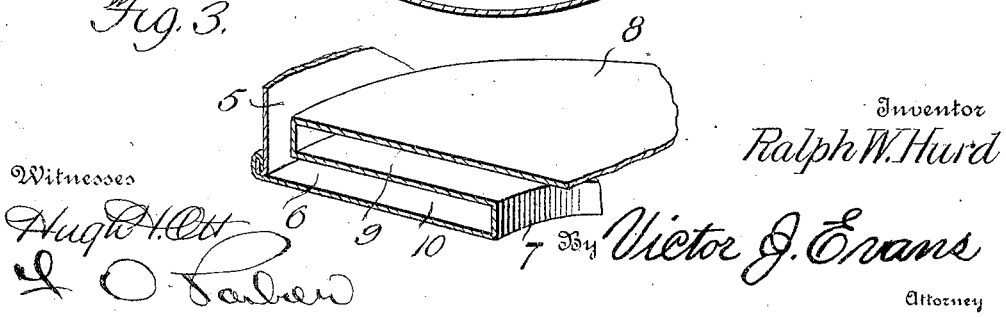
Witnesses
Hugh H. Ott
L. O. Farber
Inventor
Ralph W. Hurd
By Victor J. Evans
Attorney
COLUMBIA PLANOGRAPH CO., WASHINGTON, D. C.

UNITED STATES PATENT OFFICE.

RALPH W. HURD, OF SPOKANE, WASHINGTON.

COOKING UTENSIL.

1,051,233.  Specification of Letters Patent.  Patented Jan. 21, 1913.

Application filed January 13, 1912. Serial No. 670,983.

*To all whom it may concern:*

Be it known that I, RALPH W. HURD, a citizen of the United States, residing at Spokane, in the county of Spokane and State of Washington, have invented new and useful Improvements in Cooking Utensils, of which the following is a specification.

The invention relates to cooking utensils, and more particularly to the class of kettles.

The primary object of the invention is the provision of a utensil of this character in which the bottom thereof is formed with a heating chamber, thus enabling the contents of the utensil to become thoroughly heated, without necessitating excessive heat, the heat being confined within the chamber, during the use of the utensil, that is to say, while positioned upon a stove or other heating apparatus.

Another object of the invention is the provision of a utensil in which the bottom therof is formed with a water leg having an interposed heat space, so that water may circulate about the heat space for the heating thereof, the utensil being used in the ordinary well-known manner.

A further object of the invention is the provision of a utensil of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a vertical longitudinal sectional view through a cooking utensil constructed in accordance with the invention. Fig. 2 is a fragmentary sectional view on the line 2—2 of Fig. 1. Fig. 3 is a fragmentary perspective view of the utensil, the side wall thereof being broken away.

Similar reference characters indicate corresponding parts throughout the several views of the drawings.

Referring to the drawings by numerals, the cooking utensil comprises a body 5, preferably of cylindrical shape, the same being made of tin, copper or other metal, although it may be made of any other suitable material, if desired, and is formed at its bottom 6 with a central column 7 rising within the same and terminating in an annular head or crown 8 forming a heat space 9, the column being circumscribed by a water space 10, the head or crown 8 being designed to support articles of food placed within the utensil for the cooking thereof. The utensil is filled with water in the usual manner, which is adapted to circulate in the water space 10 when the utensil is placed upon a stove or other heating apparatus, and the heat generated therein will pass into the heat space 9 for the heating of the contents of the utensil.

Arranged within the heat space 9 and projecting radially from the column are braces 11, each being constructed from a single sheet of metal, bent into substantially square shape, and upon which is adapted to rest the head or crown 8, so as to prevent the same from becoming crushed when subjected to the weight of the contents of the utensil.

What is claimed is:

A cooking utensil comprising a body having a vertical hollow column rising from its bottom and opening through the same centrally thereof, a hollow circular shaped head forming a heating space centrally connected with the upper end of said column and communicating therewith, the said head being of a diameter slightly less than the interior diameter of the said body and spaced from the bottom thereof, and hollow braces located within the said head and extending radially from the wall of the column.

In testimony whereof I affix my signature in presence of two witnesses.

RALPH W. HURD.

Witnesses:
 FRANK SCHMIDT,
 IRA P. HOLCOMB.

---

Copies of this patent may be obtained for five cents each, by addressing the "Commissioner of Patents, Washington, D. C."